United States Patent [19]

Montiglio et al.

[11] 3,874,923

[45] Apr. 1, 1975

[54] MODIFIED FERROMAGNETIC CHROMIUM DIOXIDE COMPOSITION AND METHOD OF PREPARING THE SAME

[75] Inventors: Ugo Montiglio, Pierfrancesco Aspes; Giampiero Basile, Alessandria, both of Italy

[73] Assignee: Montecatini Edison S.p.A., Milan, Italy

[22] Filed: Apr. 11, 1973

[21] Appl. No.: 350,033

[30] Foreign Application Priority Data

Apr. 22, 1972 Italy .................................. 23466/72

[52] U.S. Cl. ............... 117/235, 252/62.51, 423/607

[51] Int. Cl. ........................................ C01g 37/02

[58] Field of Search ................. 252/62.51; 423/607; 117/235

[56] References Cited

UNITED STATES PATENTS

| | | | |
|---|---|---|---|
| 3,371,043 | 2/1968 | Hund et al. | 252/62.51 |
| 3,547,824 | 12/1970 | Mihara et al. | 252/62.51 |
| 3,767,580 | 10/1973 | Kitamoto et al. | 252/62.51 |

FOREIGN PATENTS OR APPLICATIONS

| | | | |
|---|---|---|---|
| 7,009,061 | 12/1970 | Netherlands | 252/62.51 |

*Primary Examiner*—Jack Cooper

*Attorney, Agent, or Firm*—Hubbell, Cohen & Stiefel

[57] ABSTRACT

Modified ferromagnetic chromium dioxide composition containing minor amounts of La, Y, Sr, Ba, or mixtures thereof. Said chromium dioxide is made by heating a mixture of $Cr_2(CrO_4)\cdot nH_2O$ wherein n is from 1 to 8, and La, Y, Sr, and/or Ba to 250° to 500°C under a pressure of from about 80 to 1000 atmospheres of oxygen.

16 Claims, No Drawings

MODIFIED FERROMAGNETIC CHROMIUM DIOXIDE COMPOSITION AND METHOD OF PREPARING THE SAME

BACKGROUND OF THE INVENTION

1. Field of the Invention

The present invention relates to a ferromagnetic chromium dioxide composition containing one or more suitable modifiers which renders the composition particularly useful for application in the field of magnetic recording, and to a method for preparing said composition.

2. Description of the Prior Art

Chromium dioxide has found application in various aspects of magnetic recording, such as, in magnetic tapes for audio and video recordings, in computer tapes and computer memories, records, magnetic cards, etc.

In some applications, for instance, video recording tapes, computers, and high fidelity audio recording, it is necessary that the chromium dioxide have special magnetic characteristics, such as, a coercive force of at least 300 Oersteds, (Oe), as high a sauration magnetization as possible, and a ratio of residual magnetization to saturation magnetization greater than 0.4. Moreover, the chromium dioxide should be made up of elongated particles having as uniform a length as possible.

According to the prior art, ferromagnetic chromium dioxide may be obtained by thermal decomposition of chromyl chloride, $CrO_2Cl_2$, or of $CrO_3$. Using high pressures one can obtain a pure product, which product, however, has been shown to have poor characteristics both as regards magnetic properties (the coercive force is less than 200 Oe) and as regards granulometric properties, the particles being rather large, nonhomogeneous, and not appreciably elongated.

A chromium dioxide characterized by higher values of coercive force and by smaller and more elongated particles is obtained when chromic anhydride is heated under pressure and in the presence of certain modifiers, which modifiers, at the end of the reaction, remain as constituents of the crystal lattice. Particularly suitable modifiers known in the prior art have included salts of Ru, Sb, Te, and Sn, and also alkali metal salts.

Nonetheless, even in these cases, the results obtained have not been altogether satisfactory, inasmuch as one generally does not obtain a sufficiently high coercive force (e.g., greater than 400 Oe) without at the same time decreasing the values of saturation magnetization and of residual magnetization. This is most probably due to the fact that the obtaining of high values for coercive force requires the use of larger quantities of modifier, with a resultant adverse effect or influence on the resulting ferromagnetic phase.

A previous patent application describes a method of obtaining a nonmodified $CrO_2$ exhibiting good magnetic characteristics. In this method, rather than starting with chromic anhydride, the starting material is hydrated chromium (III) chromate [i.e., $Cr_2(CrO_4)_3.nH_2O$, wherein n may vary from 1 to 8], which is heated to a temperature of about 300° to 400°C under a pressure of about 30 to 1,000 atmospheres.

SUMMARY OF THE INVENTION

The present invention provides a new chromium dioxide composition characterized by high magnetic properties and by a high degree of particle uniformity. The invention further provides a method for obtaining such a chromium dioxide composition.

The novel composition of this invention comprises a chromium dioxide containing from 0.005 to 10 percent by weight of a modifier, namely, lanthanum, yttrium, strontium, barium, or mixtures thereof.

The invention further comprises a process for obtaining the foregoing composition, which process comprises adding to hydrated chromium (III) chromate, i.e., $Cr_2(CrO_4)_3.nH_2O$ wherein n is from 1 to 8, from 0.005 to 20 percent by weight, based on the anhydrous salt ($Cr_2(CrO_4)_3$), of lanthanum, yttrium, strontium, and/or barium, either as such (metal form) or in the form of a metal compound thereof such as a metal oxide, a metal salt, or the like (such compound being added in a quantity such that the metal compounds or elements be in the percentage indicated with respect to the starting anhydrous chromium (III) chromate), and heating the resulting mixture to from about 250° to 500°C under a pressure of from about 80 to 1,000 atmospheres of oxygen. The resulting chromium dioxide composition contains from about 0.005 to 10 percent by weight of a modifier, i.e., lanthanum, yttrium, strontium, and/or barium, in the form of the metal oxide(s), and from about 55 to 62 percent by weight of chromium, which chromium is combined with oxygen, and consists of acicular particles of a tetragonal crystalline structure of the rutile type, having a length of up to 2$\mu$, an average length generally of from 0.2 to 0.5$\mu$, a length to width ratio of generally from 2:1 to 30:1 or even higher, and an average axial ratio of from about 4:1 to 8:1, which particles, under X-ray examination, show the same diffraction pattern as that of unmodified or pure chromium dioxide.

The coercive force of the above composition exceeds 280 Oersteds and may often attain a value greater than 400 Oersteds, and the saturation magnetization exceeds 60 electromagnetic units/gram and may attain a value of 90 e.m.u./g. or even higher. The residual magnetization exceeds 25 e.m.u./g. and may attain a value of 50 e.m.u./g. or higher. This composition consists of particles of a single magnetic domain.

DESCRIPTION OF THE PREFERRED EMBODIMENTS

The modifiers for obtaining the desired composition may be added to the initial chromium (III) chromate, either in their elemental form as previously indicated, or in the form of their oxides or other compounds thereof, for instance, their salts, such as halides, nitrates, sulfates, carbonates, oxalates, etc.

It has been observed, however, that the addition of a modifying element in the form of one of its salts may sometimes alter to some degree the characteristics of the chromium dioxide composition obtained, inasmuch as the anion may exert an action of its own, albeit a generally slight action, which will superimpose itself on that of the cation of the modifying element. Thus, if one desires to eliminate any possibility of any such interference, it is preferable to add the modifying agent either in the form of an oxide or in its elemental form.

Although the above described modifiers may be added to the starting hydrated chromium chromate within wide proportions, it is obvious that there are preferred amounts which will vary depending upon the particular modifying element. For La, the preferred quantity is from about 0.05 to 3 percent by weight, based on the anhydrous salt, $Cr_2(CrO_4)_3$. For Sr the preferred quantity is from about 0.2 to 3 percent by weight. For Ba the preferred quantity is from about 0.05 to 2 percent by weight. For Y, the preferred quantity is from about 0.1 to 3 percent by weight.

In the most preferred embodiment of this invention, the resultant chromium dioxide contains from 59.7 to 61.8 percent by weight of chromium and from 0.05 to 1 percent by weight of modifying elements. Such modified chromium dioxide consists of acicular and very homogeneous particles of a length less than 0.6 micron and generally from about 0.15 to 0.6$\mu$, with an average length generally from about 0.25 to 0.4$\mu$, and which show a length/width axial ratio of from about 3:1 to 30:1, with the average axial ratio generally being from about 5:1 to 8:1. The coercive force is greater than 350 Oersteds and may attain a value of 450 Oersteds or higher. The magnetization saturation is greater than 80 e.m.u./g. and may attain a value of 90 e.m.u./g. or higher. The residual magnetization is greater than 44 e.m.u./g. and may exceed 50 e.m.u./g.

The hydrated chromium (III) chromate, which serves as the starting material for obtaining the products of this invention, is a salt that may readily be obtained according to simple chemical reactions well known in the literature. (For a full review, see for instance, "Gmelins Handbuch der Anorganischen Chemie," Verlag Chemie (1962), 8th Edition - Chrom, Part B, pages 104-105.)

Hydrated chromium (III) chromate is soluble in water and is shown to be amorphous under X-ray examination. Examination under infra red (I.R.) light shows a wide absorption band that starts at 9.5$\mu$, reaches a maximum at 10.5$\mu$, and extends up to 15$\mu$.

A convenient method for obtaining hydrated chromium (III) chromate is by reduction of $CrO_3$ with methyl alcohol in a stoichiometric quantity, according to the following reaction:

$$5\ CrO_3 + CH_3OH \rightarrow Cr_2(CrO_4)_3 + 2H_2O + CO_2.$$

The resulting aqueous solution is evaporated under vacuum until attaining the desired content of water of crystallization.

To the chromium (III) chromate hydrate is then added the desired modifying agent. In order to obtain a suitable mixing of the substance, the chromium (III) chromate and the modifying agent may be intimately ground together in an agate mortar.

A variant which frequently is preferable, because it ensures a still greater degree of uniformity of mixing and ultimately leads to a more homogeneous product, involves adding the modifying agent before evaporation of the chromium (III) chromate solution resulting from the reduction of the $CrO_3$ with alcohol. This system is particularly useful where the modifying agent is soluble in the aqueous chromium (III) chromate solution. In such case, in fact, the distribution of the modifying agent in the chromium (III) chromate proves to be completely homogeneous and, after reaction, will result in the most homogeneous product granulometry, with the product exhibiting the best magnetic characteristics.

Hydrated chromium (III) chromate, after addition of the desired modifying agent, is transformed into a ferromagnetic composition of modified chromium dioxide, by heating in a suitable apparatus. One type of such apparatus is hereinafter described by way of example.

This apparatus consists essentially of an autoclave made of stainless steel or other suitable material, there having been placed in the autoclave, before starting the reaction, the hydrated chromium (III) chromate to which has been added the modifying agent.

The autoclave is provided with a first valve which, if desired, permits one to discharge the oxygen that is formed during the reaction, so that the pressure may be maintained at a constant value; a second valve for creating, before starting the reaction, the desired pressure by means of an external source of oxygen, and a manometer or pressure gauge for measuring said pressure.

A thermocouple, inserted into the reaction mass, enables one to follow on a recorder the progression of the internal temperature in relationship with time.

The autoclave may be heated in a muffle furnace of suitable size, or in a chamber provided with hot gas circulation, or with other equivalent heating equipment. The temperature that is reached inside the autoclave at the end of the reaction is preferably from about 300° to 350°C. The final pressure is preferably maintained at from about 200 to 400 atmospheres, though lower pressures, down to about 30 atmospheres, may also be used. Higher pressures, up to 1,000 atmospheres or more, while leading to the obtaining of the desired chromium dioxide, are unduly expensive and hence, although operable, are neither practical nor necessary.

The characteristics of the modified chromium dioxide of the present invention were investigated as follows:

By an X-ray diffractometer, inasmuch as $CrO_2$ possesses a characteristic diffraction spectrum whose main reflections, defined for quantitative and qualitative analyses, are:

| | Relative Intensity about |
|---|---|
| d = 3.11 A | 100 |
| d = 1.63 A | 75 |
| d = 2.42 A | 60 |

By electron microscope examination, for instance, at 50,000 magnetifications, which enables one to establish the granulometric distribution and the shape of the particles obtained;

By evaluation of the following magnetic characteristics: saturation magnetization ($\sigma_s$), residual magnetization ($\sigma_r$), and coercive force ($H_c$), $\sigma_s$ and $\sigma_r$ being expressed in electromagnetic units/grams, and $H_c$ being expressed in Oersteds.

The foregoing magnetic characteristics were determined by means of a magnetometer of the Foner type with a vibrating sample, capable of supplying a maximum field of 18,000 Oersteds.

In the following examples which further illustrate the invention, all parts are by weight unless otherwise stated.

EXAMPLE 1

The chromium (III) chromate used as the starting material for obtaining the $CrO_2$ was prepared as follows:

2,000 g of $CrO_3$ were dissolved in distilled water, and the volume of the solution was brought to 4 liters.

The solution was placed into a 4-necked 10 liter flask fitted with a stirrer, a reflux cooler and a thermometer.

To the solution were then added dropwise 160 cc of $CH_3OH$ and the solution was then brought to boiling and kept boiling for about 6 hours, until the alcohol had reacted, being transformed into $CO_2$.

10 cc were then drawn from the solution and on this sample the $Cr^{+6}/Cr^{+3}$ ratio was determined by iodometric titration of the hexavalent chromium and by the determination of the total chromium after oxidation with $Na_2O_2$. The ratio thus found was 1.5.

Then, 500 cc of the solution thus obtained were evaporated in a drier under vacuum, at 80°C for 48 hours.

Thereby was obtained a dark brown vitreous-like mass, and the $Cr^{+6}/Cr^{+3}$ was again determined and was shown to have remained unchanged. The water content was 10.7% (corresponding to 3 moles of $H_2O$ per mole of $Cr_2(CrO_4)_3$).

110.7 g of the foregoing brown mass were ground in an agate mortar together with 0.5 g of lanthanum in the form of $La_2O_3$, until complete homogenization was attained, and the granulometric size of the chromium chromate was 1–10$\mu$.

This chromium chromate/lanthanum oxide mixture was then poured into a 130 ml titanium test tube, which was then placed into an autoclave of the type previously described, made of stainless steel and having an internal volume of 240 ml.

In the air space between test tube and autoclave wall there were placed about 20 cc of distilled water.

The autoclave was heated in a muffle furnace maintained at a temperature of 380°C. At the start, inside the autoclave there was established, by means of an oxygen bottle, a pressure of 85 atmospheres.

During the heating, the pressure inside the autoclave rose due to (1) the oxygen that was formed, (2) water evaporated, and (3) the effect of thermal expansion of the gases. After 4 hours, the interior of the autoclave reached a temperature of 330°C, which temperature was then maintained for 130 minutes. The final pressure was to 360 atmospheres.

After cooling, the pressure was released and the autoclave was opened.

In the container there had formed a black powder that was then ground in a ball mill and finally washed with water until the washing water was clear. The powder was then dried in an oven.

An X-ray diffractogram of the product showed that it was $CrO_2$.

Under the electron microscope the product was shown to be made up of very homogeneous, needlelike particles of a length of from 0.15 and 0.55 micron, with an average length of 0.35$\mu$, and having an average length/width ratio of 7:1.

Analysis with a fluorescent X-ray spectrometer showed that lanthanum was present in an amount of 0.26 percent by weight of the product obtained, the remainder consisting of chromium (61.5%) and oxygen (38.24%, by difference).

The magnetic characteristics were as follows:

| | | |
|---|---|---|
| $H_c$ | = 430 | Oersteds |
| $\sigma_s$ | = 87.9 | Gauss cc/g |
| $\sigma_r/\sigma_s$ | = 0.48 | |

By comparison, chromium dioxide obtained under the same conditions, but from chromium (III) chromate that had not been admixed with lanthanum oxide, showed the following characteristics: length of the particles between 0.1 to 0.6$\mu$ with an average length of 0.27$\mu$and an average length/width ratio equal to 4:1.

The magnetic characteristics were as follows:

| | | |
|---|---|---|
| $H_c$ | = 335 | Oersteds |
| $\sigma_r$ | = 86 | Gauss cc/g |
| $\sigma_r/\sigma_s$ | = 0.48 | |

EXAMPLES 2–4

To each of three chromium chromate solutions obtained by reduction of $CrO_3$ with $CH_3OH$ as described in Example 1, there was added $La_2O_3$ in such amount that the solutions contained, respectively, 1%, 1.5%, and 2% by weight of lathanum based on the anhydrous $Cr_2(CrO_4)_3$.

The three solutions were then evaporated under vacuum until attaining a content of crystallization water of 10% to 11%.

After comminution in a mortar, the chromium chromate/lanthanum oxide mixture was treated in an autoclave under the same conditions as employed in Example 1.

The final pressures, the final temperature, the time during which the reaction mass was maintained at this final temperature, and the magnetic characteristics of the chromium dioxide products obtained are set out in Table I hereinafter.

TABLE I

| Example No. | La,% by weight | REACTION CONDITIONS: Final pressure, atmospheres | Final temperature, °C | Residence time at final temperature, min. | MAGNETIC CHARACTERISTICS: $H_c$, Oersteds | $\sigma_s$ Gauss cc/g | $\sigma_r/\sigma_s$ |
|---|---|---|---|---|---|---|---|
| 2 | 1.0 | 350 | 325 | 150 | 440 | 87.8 | 0.54 |
| 3 | 1.5 | 360 | 340 | 180 | 420 | 86.4 | 0.50 |
| 4 | 2.0 | 360 | 335 | 160 | 400 | 86.4 | 0.50 |

The $CrO_2$ sample of Example 2 contained 0.33% of lanthanum.

EXAMPLES 5–6

To two $Cr_2(CrO_4)_3$ solutions obtained by the method described in Example 1, by reduction of $CrO_3$ with $CH_3OH$, before evaporating to dryness, there were added, respectively, 1% of lanthanum (based on the anhydrous $Cr_2(CrO_4)_3$ present) in the form of $La(NO_3)_3$, and in the form of $LaCl_3$. After evaporation there was attained a content of crystallization water corresponding to about 3 moles of water per mole of $Cr_2(CrO_4)_3$. After comminution in a mortar, the mixture was reacted under the same conditions as described in Example 1. The reaction conditions and the characteristics of the modified $CrO_2$ obtained are set out in Table II hereinafter.

TABLE II

| Example No. | Type of Modifier | REACTION CONDITIONS Final Pressure, atms. | Final Temperature, °C | Residence time at final temperature, min. | MAGNETICAL CHARACTERISTICS $H_c$, Oersteds | $\sigma_s$ Gauss cc/g | $\sigma_r/\sigma_s$ |
|---|---|---|---|---|---|---|---|
| 5 | $La(NO_3)_3$ | 365 | 340 | 210 | 340 | 87.1 | 0.44 |
| 6 | $La(Cl)_3$ | 355 | 350 | 180 | 405 | 86.5 | 0.51 |

The $CrO_2$ of Example 6 contained 0.28% by weight of La.

EXAMPLES 7–10

The following examples demonstrate the effect of the incorporation of strontium in $CrO_2$.

Using the procedure of Examples 2–6, four solutions of chromium (III) chromate were prepared.

To three of these solutions $SrCl_2$ was added in such quantity that the respective percentages of strontium with respect to the anhydrous $Cr_2(CrO_4)_3$ were 0.5%, 1.0% and 1.88% by weight. To the fourth solution was added $SrSO_4$ in such amount as to provide 1% of Sr with respect to the anhydrous $Cr_2(CrO_4)_3$ present. The solutions were then evaporated to a water content of about 10 percent by weight.

The procedure was then carried out according to the preceding examples, comminuting the mixture in a mortar and then putting the whole in an autoclave for reaction.

In Table III hereinafter, there are reported the reaction conditions and the magnetic characteristics of the $CrO_2$ products obtained.

TABLE III

| Example No. | Type of Modifier | Sr, % by in anhydrous $Cr_2(CrO_4)_3$ | REACTION CONDITIONS Final Pressure, atms. | Final Temp. °C | Residence Time at Final Temp., min. | MAGNETIC CHARACTERISTICS $H_c$, Oersteds | $\sigma_s$ Gauss cc/g | $\sigma_r/\sigma_s$ |
|---|---|---|---|---|---|---|---|---|
| 7 | $SrCl_2$ | 0.5 | 365 | 330 | 200 | 360 | 87.4 | 0.49 |
| 8 | $SrCl_2$ | 1 | 340 | 330 | 190 | 410 | 85.3 | 0.56 |
| 9 | $SrCl_2$ | 1.88 | 350 | 335 | 130 | 400 | 86.2 | 0.57 |
| 10 | $SrSO_4$ | 1.0 | 340 | 335 | 180 | 400 | 87.1 | 0.51 |

The $CrO_2$ sample of Example 8 contained 0.25% by weight of strontium.

EXAMPLES 11–13

The following examples illustrate the characteristics of $CrO_2$ modified with yttrium.

Following the procedure described in Example 1, three samples of 110.7 g of $Cr_2(CrO_4)_3.3H_2O$ were mixed in an agate mortar with respectively: 0.5 g, 1 g, and 2 g of yttrium in the form of $Y_2O_3$. These mixtures were then reacted as described previously.

The reaction conditions and the magnetic characteristics for the $CrO_2$ products obtained are set out in Table IV hereinafter.

TABLE IV

| Example No. | Y added, % by weight | REACTION CONDITIONS Final Pressure, atms. | Final Temperature, °C | Residence Time at Final Temp., min. | MAGNETIC CHARACTERISTICS $H_c$, Oersteds | $\sigma_s$ Gauss cc/g | $\sigma_r/\sigma_s$ |
|---|---|---|---|---|---|---|---|
| 11 | 0.5 | 350 | 340 | 210 | 410 | 88.1 | 0.52 |
| 12 | 1.0 | 350 | 330 | 120 | 410 | 86.2 | 0.49 |
| 13 | 2.0 | 340 | 320 | 160 | 380 | 87.3 | 0.53 |

The $CrO_2$ of Example 11 contained 0.11% by weight of yttrium.

EXAMPLES 14–17

The following examples illustrate the use of barium as the modifier.

To four solutions of $Cr_2(CrO_4)_3$, obtained by the reduction of $CrO_3$ with $CH_3OH$ according to the procedure described in Example 1, were added respectively, 0.5% by weight of barium based on the anhydrous chromate, in the form of $BaCl_2$; 1.0% by weight of barium in the form of $BaCl_2$; 2.0% by weight of barium in the form of $BaCl_2$; and 1.0% by weight of barium in the form of $BaSO_4$.

After evaporation, grinding and reaction according to the previously described examples, the chromium dioxides obtained showed the magnetic characteristics reported in Table V hereinafter.

TABLE V

| Example No. | Type of Modifier | Ba, % by weight in anhydrous $Cr_2(CrO_4)_3$ | REACTION CONDITIONS Final Pressure, atmospheres | Final Temperature, °C | Residence Time at Final Temperature, min. | MAGNETIC CHARACTERISTICS $H_c$, Oersteds | $\sigma_s$ Gauss cc/g | $\sigma_r/\sigma_s$ |
|---|---|---|---|---|---|---|---|---|
| 14 | $BaCl_2$ | 0.5 | 350 | 300 | 200 | 390 | 85.9 | 0.52 |
| 15 | $BaCl_2$ | 1.0 | 345 | 330 | 150 | 380 | 85.3 | 0.46 |
| 16 | $BaCl_2$ | 2.0 | 360 | 340 | 120 | 365 | 83.7 | 0.44 |
| 17 | $BaSO_4$ | 1.0 | 355 | 335 | 125 | 380 | 83.2 | 0.47 |

The barium content in the $CrO_2$ samples was as follows: Example 14 = 0.42% by weight; Example 16 = 1.53% by weight; Example 17 = 0.79% by weight.

EXAMPLES 18–19

The following examples are given for comparative purposes to illustrate the effect of known modifiers on the magnetic characteristics of $CrO_2$ obtained from chromium (III) chromate.

To two samples of a $Cr_2(CrO_4)_3$ solution obtained by the reduction of $CrO_3$ with $CH_3OH$ according to the procedure described in Example 1, there were respectively added 1% Sb, in the form of $SbCl_3$, and 1% of Sn in the form of $SnCl_2$, each based on the anhydrous $Cr_2(CrO_4)_3$.

After evaporation until a content in crystallization water of about 10% by weight was attained, and after communition in a mortar, the mixtures were reacted under the same conditions as in the preceding examples.

The $CrO_2$ products obtained showed the magnetic characteristics as set out in Table VI hereinafter.

TABLE VI

| Example No. | Type of Modifier | REACTION CONDITIONS Final Pressure, atm. | Final Temperature, °C | Residence Time at Final Temperature, min. | MAGNETIC CHARACTERISTICS $H_c$, Oersted | $\sigma_s$ Gauss cc/g | $\sigma_r/\sigma_s$ |
|---|---|---|---|---|---|---|---|
| 18 | $SbCl_3$ | 350 | 330 | 200 | 280 | 83.1 | 0.37 |
| 19 | $SnCl_2$ | 360 | 330 | 180 | 285 | 84.3 | 0.40 |

As is clearly shown from Table VI, the known modifiers of the prior art give a chromium dioxide composition that exhibits magnetic characteristics that are distinctly inferior to those obtained when using the modifiers of the present invention.

Variations can, of course, be made without departing from the spirit and scope of the invention.

Having thus described the invention, what is desired to be secured by Letters Patent and hereby claimed is:

1. A modified ferromagnetic chromium dioxide composition, consisting of about 55 to 62 percent by weight of chromium, said chromium being combined with oxygen, and from about 0.005 to 10 percent by weight of a modifier selected from the group consisting of lanthanum, yttrium, strontium and barium, and mixtures thereof in the form of the oxide(s), the balance being oxygen, said composition being in the form of acicular particles having a length less than $2\mu$ and an axial length to width ratio greater than 2:1 and having a tetragonal crystalline structure of the rutile type; said composition having a coercive force greater than 280 Oersteds, a saturation magnetization greater than 60 e.m.u./g and a residual magnetization greater than 25 e.m.u./g.

2. A method of making the modified chromium dioxide of claim 1 comprising intimately admixing a hydrated chromium (III) chromate of the formula $Cr_2(CrO_4)_3.nH_2O$ wherein $n$ is from 1 to 8, with a modifier, said modifier being present in an amount of from about 0.005 to 20 percent by weight of the anhydrous salt, $Cr_2(CrO_4)_3$, said modifier being selected from the group consisting of lanthanum, yttrium, strontium, barium, their oxides, their salts, and mixtures thereof, and heating the foregoing admixture to a temperature of from about 250° to 500°C under a pressure of from about 80 to 1,000 atmospheres of oxygen.

3. The method of claim 2, wherein the modifier which is admixed is lanthanum, lanthanum oxide, or a lanthanum salt, and wherein the amount of modifier is such as to provide from 0.05 to 3 percent by weight of lanthanum, expressed as metal, based on the anhydrous salt.

4. The method of claim 2, wherein the modifier which is admixed is strontium, strontium oxide, or a strontium salt, and wherein the amount of modifier is such as to provide from 0.2 to 3 percent by weight of strontium, expressed as metal, based on the anhydrous salt.

5. The method of claim 2, wherein the modifier which is admixed is barium, barium oxide, or a barium salt, and wherein the amount of modifier is such as to provide from 0.05 to 2 percent by weight of barium, expressed as metal, based on the anhydrous salt.

6. The method of claim 2, wherein the modifier which is admixed is yttrium, yttrium oxide, or an yttrium salt, and wherein the amount of modifier is such as to provide from 0.1 to 3 percent by weight of yttrium, expressed as metal, based on the anhydrous salt.

7. The method of claim 2 wherein said intimate admixing is carried out in the solid state.

8. The method of claim 2 wherein said intimate admixing is effected by adding the modifier to a solution of the chromium (III) chromate.

9. An element for magnetic recording comprising a nonmagnetic supporting material carrying bonded to it a magnetic track made of a ferromagnetic composition of modified chromium dioxide as defined in claim 1.

10. The element of claim 9 wherein the modifier is lanthanum.

11. The element of claim 9 wherein the modifier is yttrium.

12. The composition of claim 1 wherein the modifier is lanthanum.

13. The composition of claim 1 wherein the modifier is yttrium.

14. A chromium dioxide consisting of from about 59.7 to 61.8 percent by weight of chromium, said chromium being combined with oxygen, and from about 0.05 to 1 percent by weight of a modifier selected from the group consisting of lanthanum, yttrium, strontium and barium, and mixtures thereof in the form of the oxide(s), the balance being oxygen, said composition being in the form of acicular particles of a tetragonal crystalline structure of the rutile type, the particle length being less than 0.6$\mu$, and the particles having a length/width axial ratio between 3:1 and 30:1; said composition having a coercive force of at least 350 Oersteds, a saturation magnetization greater than 80 e.m.u./g., and a residual magnetization greater than 44 e.m.u./g.

15. The composition of claim 14 wherein the modifier is lanthanum.

16. The composition of claim 14 wherein the modifier is yttrium.

* * * * *

PO-1050
(5/69)

UNITED STATES PATENT OFFICE
CERTIFICATE OF CORRECTION

Patent No. 3,874,923 Dated April 1, 1975

Inventor(s) Ugo Montiglio et al

It is certified that error appears in the above-identified patent and that said Letters Patent are hereby corrected as shown below:

Title page, left side, under "Inventors": "Ugo Montiglio, Pierfrancesco Aspes; Giampiero Basile, Alessandria, both of Italy" should read -- Ugo Montiglio, Pierfrancesco Aspes, Giampiero Basile; all of Alessandria, Italy --.

Title page, left side, under "Foreign Application Priority Data": "23466/72" should read -- 23466 A/72 --.

Column 4, line 48: "magnetifications," should read -- magnifications, --.

Column 6, line 33: "lathanum" should read -- lanthanum --.

Signed and sealed this 10th day of June 1975.

(SEAL)
Attest:

RUTH C. MASON
Attesting Officer

C. MARSHALL DANN
Commissioner of Patents
and Trademarks